United States Patent [19]

Birkenhead

[11] 4,131,887
[45] Dec. 26, 1978

[54] INTRUSION ALARM SYSTEM UTILIZING THE BARKING OF A WATCHDOG

[76] Inventor: Warren D. Birkenhead, 59-529 Hoalike Rd., Haleiwa, Hi. 96712

[21] Appl. No.: 768,271

[22] Filed: Feb. 14, 1977

[30] Foreign Application Priority Data

Aug. 19, 1976 [JP] Japan .................................. 51-99191

[51] Int. Cl.² ............................................ G08B 13/00
[52] U.S. Cl. .................................... 340/566; 340/541; 340/573
[58] Field of Search ................................ 340/261, 279

[56] References Cited

U.S. PATENT DOCUMENTS 3,713,126  1/1973  Stettner .................................. 340/261

Primary Examiner—Glen R. Swann, III

[57] ABSTRACT

A system is described which detects the sound of barking of a watchdog and generates an electric signal in response to that barking. The electric signal, suitably processed by electronic circuitry, is used to operate an appropriate intrusion reaction device, such as an audible alarm, floodlights, or a remote indicator device located at a guard or police station.

5 Claims, 1 Drawing Figure

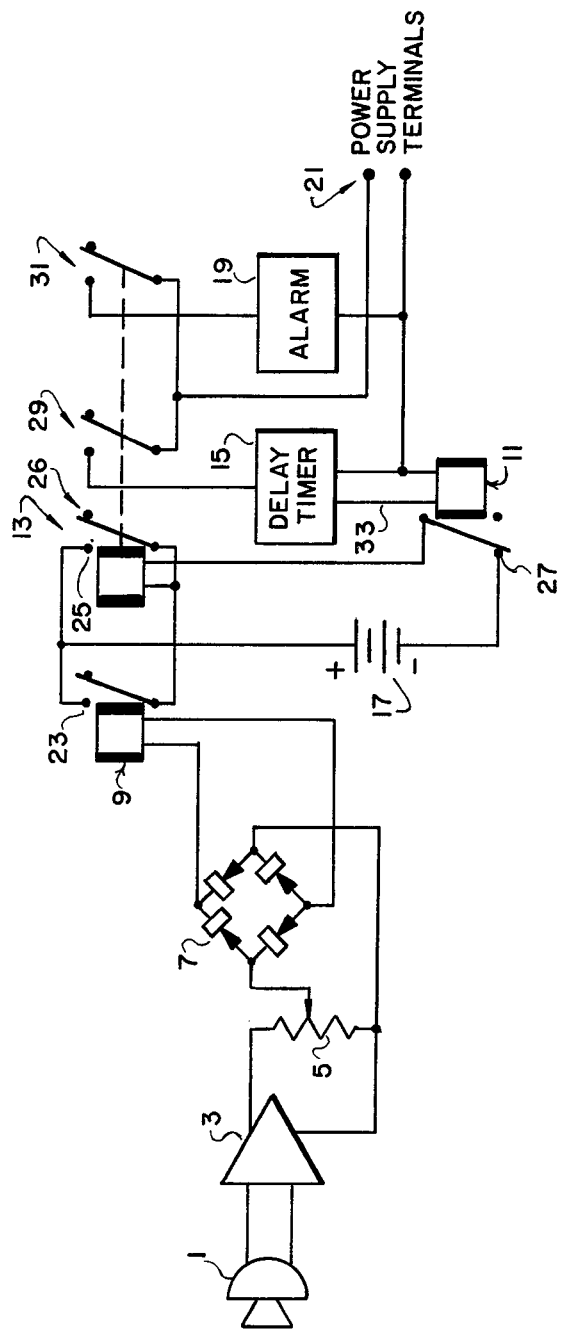

INTRUSION ALARM SYSTEM UTILIZING THE BARKING OF A WATCHDOG

BACKGROUND OF THE INVENTION

The present invention relates to intrusion alarms and, more particularly, to a method and apparatus which relies on the detection of an auditory cry of alarm of an animal to operate an intrusion reaction device.

Throughout recorded history, men have relied upon the superior olfactory and auditory senses of other animals to give them warning of the approach of danger or an intruder. In primitive societies, the cries of alarm of various birds and other animals are carefully learned by men for their value in detecting the presence of danger.

Even in industrialized societies, watchdogs are commonly kept for the purposes of giving an alarm and for frightening away would-be intruders. Such watchdogs have highly refined sensory mechanisms, including senses of hearing and smell far superior to those possessed by human beings. Watchdogs also have an ability to distinguish between known and unknown persons and, some believe, to discern friendly or hostile intentions from the actions or demeanor of unknown persons.

Thus the watchdog is, in some ways, ideally suited as an indicator of hostile intrusion or intended burglary. No electronic detector yet devised can match either the sensitivity or the discriminatory ability of a watchdog in defending against hostile intrusions.

There are, nevertheless, situations in which the barking of a watchdog is an inadequate warning, and an inadequate deterrent to hostile intrusions. For example, if the watchdog is kept in a remote building or kennel located some distance from a main dwelling, his barking may not be adequate to awaken sleeping residents. Also, if the dog is confined, his barking may not deter a would-be intruder from entering into a protected area, for example.

Accordingly, some auxiliary means of sensing the barking of a watchdog or, indeed, the cry of alarm of any animal kept on premises, is desirable. Such an auxiliary means might be used to provide a remote indication of intrusion or might be used to operate a defensive mechanism by, for example, turning on floodlights or electrically locking doors or gates.

SUMMARY OF THE INVENTION

The present invention provides a means of detecting and processing the cry of alarm of an animal, especially the barking of a watchdog, so that such auditory signal can be effectively used to operate an intrusion reaction device, such as a remote alarm, floodlights, or electric locks. By such means, the highly developed detective senses of an animal are married to reliable and effective electrically operated reactive devices to provide an especially effective system for deterring or combatting intrusion.

Broadly, the apparatus of the invention includes a microphone means for detecting the cry of alarm of an animal and producing a corresponding electrical signal therefrom, together with an audio amplifier means to increase the amplitude of that signal to a level sufficient to operate a normally open switch means. Such switch means is closed when operated to close the electric circuit of an electrically operated intrusion reaction device. The method of the invention broadly includes the steps of electrically detecting the cry of alarm of an animal uttered in response to the approach of an intruder to generate an electrical signal indicative of such approach, and applying the electrical signal to operate an intrusion reaction device.

A prominent feature of the method and apparatus of the invention is the provision of a selectable delay between the time of initiation of the cry of alarm from the animal and the termination of operation of the intrusion reaction device. This feature protects against the possibility that the animal might be quickly killed or disabled by a would-be intruder before the alarm had operated for a sufficient time to give warning to the inhabitants of a dwelling, for example. The same feature also protects against the possibility that the desired recipients of the alarm might be temporarily distracted or absent and thereby not notice a very brief alarm.

BRIEF DESCRIPTION OF THE DRAWING

The single FIGURE of the drawing is a schematic illustration of an electronic circuit which is a preferred embodiment of the apparatus of the invention.

DETAILED DESCRIPTION OF THE PREFERRED EMBODIMENT

The single FIGURE of the drawing illustrates a preferred electronic circuit embodying the principles of the intrusion alarm of the present invention. A microphone 1 is so positioned as to receive the audio signal produced by the bark of a dog or the cry of alarm of any animal. The electrical signal correspondingly produced by microphone 1 is passed to audio amplifier 3 which produces an amplified version of such signal. This signal may be attenuated if necessary by attenuator 5 and rectified, again if necessary, by bridge rectifier 7 to produce a DC signal which is then used to operate a first switch means in the form of relay 9.

Although relay 9 could itself be used to turn on any desired intrusion reaction device, it is a prominent feature of the present invention as noted above to provide a selectable delay between the time that the audio signal at microphone 1 begins and the time at which the alarm or intrusion reaction device ceases functioning. Accordingly, the remaining portions of the circuit of the drawing provide such a delay. A second switch means in the form of relay 11, a third switch means in the form of relay 13, a delay timer 15 and a DC power supply 17, are interconnected between the just described circuitry (elements 1-9 of the drawing) and an intrusion reaction device indicated generally on the drawing by alarm 19. Alarm 19 could comprise humanly sensible alarms such as audio and video devices like electric horns or other sound transducers or electric lamps or even a defensive device such as an electric lock on a door. Also included within the scope of alarm 19 are recording devices such as automatic audio and video recorders including photographic cameras some of which may be remotely controlled or located, such as at a police station. A pair of power supply terminals 21 are connected, in use of the system, to either a DC or AC main supply or other source of electric power.

As can be seen, the normally open contact 23 of relay 9 is electrically connected to the normally open contact 25 of the first set of contacts 26 of relay 13. Similarly, the armatures of these switch elements are electrically interconnected. Normally open contacts 23 and 25 are both connected to the positive side of DC power supply 17, while the negative side of this supply is connected by means of the normally closed contact 27 of relay 11 to one side of the coil of relay 13. The other side of the coil of relay 13 is connected to the common lead between the armatures of relays 9 and 13.

The three sections of relay 13 have a single dotted line drawn through them in the drawing to indicate that they all operate simultaneously upon actuation of relay 13. The second set of contacts 29 and third set of contacts 31 of relay 13 are connected as follows: the normally open contact of contact set 29 is connected to delay timer 15 which in turn is connected to one side of the coil of relay 11. The other side of the coil of relay 11 is connected to one of the power supply terminals 21. The other power supply terminal 21 is connected to both of the armatures of contact sets 29 and 31. The normally open contact of contacts 31 is connected to one input terminal of alarm 19, the other input terminal being connected to one of the power supply terminals 21.

In operation, the circuitry of the drawing functions as follows: A cry of alarm or the barking of a dog picked up by microphone 1, amplified by amplifier 3 and attenuated and rectified as necessary by attenuator 5 and bridge rectifier 7, actuates the first switch means (relay 9) which closes the circuit from the plus terminal of DC power supply 17 through normally open contact 23 of the relay 9 to one of the terminals of the coil of relay 13. The other terminal of the coil of relay 13 is connected to the negative side of power supply 17 by means of the normally closed contact 27 of the second switch means (relay 11). Since relay 13 therefore has its coil energized, all of its normally open contacts are closed.

The first set of contacts 26 of relay 13 is connected in parallel with the contacts of relay 9 to "latch" relay 13 by continuing to supply power to its coil even if the contacts of relay 9 should open. The second set of contacts 29 of relay 13 serve to connect delay timer 15 to power supply terminals 21. Delay timer 15 which could be an electronic or motor driven timer switch, for example, completes the circuit between terminals 21 and the coil of relay 11 by means of delay lead 33 only after a selectable delay time following the closure of contact set 29.

The third set of contacts 31 of relay 13 apply power to alarm 19 so long as the coil of relay 13 is energized.

At the end of the selectable delay time provided by delay timer 15, the following sequence of events occurs: the coil of relay 11 becomes energized, opening normally closed contact 27, thus removing the power energizing coil 13. Since all three sets of contacts of relay 13 are opened, alarm 19 is turned off while power to energize the coil of relay 11 is also cut off permitting contacts 27 to close. Thus the system has returned to its initial state such that if there is a further sound of barking received by microphone 1 the complete sequence of operation will repeat. It is to be noted, though, that while relay 13 and alarm 19 are activated, additional sounds transduced by microphone 1 will have no effect on the system until after the timer has completed its cycle and relay 11 contacts are open.

Many modifications could be made to the device according to this application without departing from the principles of the invention. For example, the first switch means (relay 9), the second switch means (relay 11) and the third switch means (relay 13) could all be replaced by suitable solid state devices such as control rectifiers. Furthermore, although the described embodiment relies merely on amplitude of signal (selectable by means of attenuator 5) to discriminate between the sound of a barking dog, for example, and other ambient sounds, it is entirely feasible if necessary to incorporate other more sophisticated means of discrimination. Because of these and other possible changes which lie within the scope of the invention, it is intended that the coverage afforded applicant be limited only by the claims and their legal equivalents.

I claim:

1. An intrusion alarm for detecting the cry of an animal uttered in response to the approach of an intruder, and for actuating an electrically operated intrusion reaction device, comprising: microphone means responsive to audio signals to produce corresponding electrical signals therefrom; audio amplifier means operatively connected to said microphone means to amplify said electrical signals; a first switch means operatively connected to said audio amplifier means and being normally open but closing in response to receipt of said electrical signals; an electrically operated intrusion reaction device; delay means to cause said intrusion reaction device to operate for a selected period of time after said first swithc means has closed, comprising second and third switch means; said second switch means being normally closed and said third switch means being normally open, said third switch means responding to the closing of said first switch means by itself closing to complete an energizing circuit for said intrusion reaction device and to initiate a delay of said selected period of time provided by said delay means, said second switch means being operative to open at the end of said selected period of time to again open said third switch means and, hence, break said energizing circuit for said intrusion reaction device.

2. A method of detecting and reacting to an intruder comprising the steps of:
   A. electrically detecting the cry of alarm of an animal uttered in response to the approach of an intruder to generate an electrical signal indicative of said approach; and
   B. applying said electrical signal to operate an intrusion reaction device.

3. The method of claim 2 wherein said intrusion reaction device is a humanly sensible alarm.

4. The method of claim 2 further including the step of operating said intrusion reaction device for a selected period of time following the initiation of said cry of alarm.

5. The method of claim 4 wherein said step of operating said intrusion reaction device for a selected period of time following the initiation of said cry of alarm includes the steps of activating a delay timer in response to the generation of an electrical signal indicative of the approach of an intruder and ceasing operation of said intrusion reaction device upon the termination of a selected delay time provided by said delay timer.

* * * * *